(12) United States Patent
De La Cerda

(10) Patent No.: US 8,910,753 B1
(45) Date of Patent: Dec. 16, 2014

(54) CUSTOMIZABLE BRAKE MONITORING SYSTEM

(71) Applicant: Fernando De La Cerda, Bonita, CA (US)

(72) Inventor: Fernando De La Cerda, Bonita, CA (US)

( * ) Notice: Subject to any disclaimer, the term of this patent is extended or adjusted under 35 U.S.C. 154(b) by 2 days.

(21) Appl. No.: 13/915,115

(22) Filed: Jun. 11, 2013

(51) Int. Cl.
*F16D 66/00* (2006.01)
*B60T 17/22* (2006.01)

(52) U.S. Cl.
CPC .................................... *B60T 17/221* (2013.01)
USPC ................. 188/1.11 L; 188/79.51; 188/79.55

(58) Field of Classification Search
USPC ................ 188/1.11 L, 79.51–79.58; 340/454
See application file for complete search history.

(56) References Cited

U.S. PATENT DOCUMENTS

| | | | |
|---|---|---|---|
| 90,114 A | 5/1869 | Mead | |
| 2,979,364 A | 4/1961 | Putnam et al. | |
| 4,757,300 A * | 7/1988 | Sebalos | 340/454 |
| 5,251,967 A | 10/1993 | Eberling | |
| 5,450,930 A * | 9/1995 | Martens et al. | 188/1.11 L |
| 5,791,441 A * | 8/1998 | Matos et al. | 188/1.11 L |
| 6,255,941 B1 * | 7/2001 | Osterman et al. | 340/479 |
| 6,257,374 B1 * | 7/2001 | Strzelczyk et al. | 188/1.11 L |
| 6,352,137 B1 * | 3/2002 | Stegall et al. | 188/1.11 L |
| 6,481,542 B2 * | 11/2002 | Giering et al. | 188/71.7 |
| 7,624,849 B2 * | 12/2009 | Goncalves et al. | 188/1.11 R |
| 2004/0090114 A1 | 5/2004 | Macnamara et al. | |
| 2013/0072351 A1 | 3/2013 | Wallace | |

* cited by examiner

*Primary Examiner* — Christopher Schwartz
(74) *Attorney, Agent, or Firm* — Paul R. Martin

(57) ABSTRACT

An air brake monitoring system which provides a warning signal, either visual or audible, to truckers informing them when their brake system needs corrective attention. More particularly, the system of the present invention permits the brake monitoring system to be easily adjusted to account for the needs and desires of the individual vehicle operator.

10 Claims, 4 Drawing Sheets

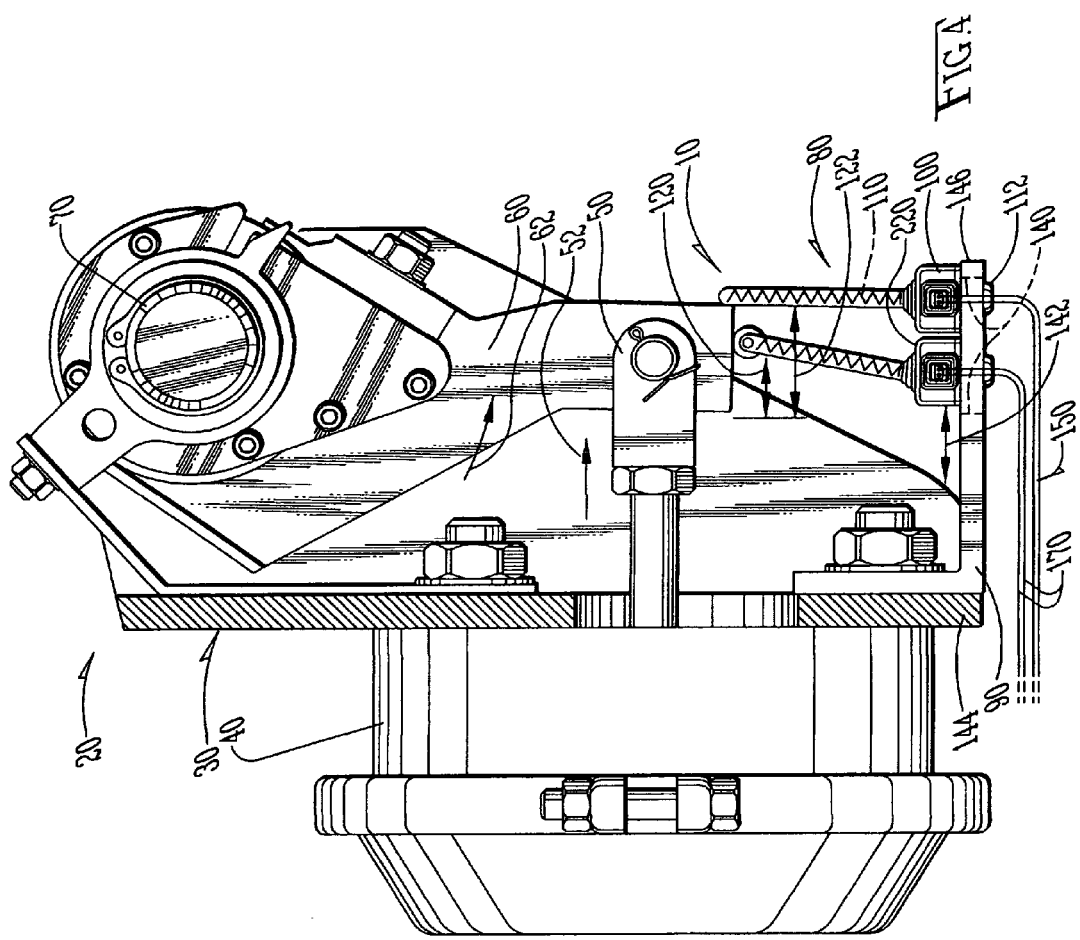

CUSTOMIZABLE BRAKE MONITORING SYSTEM

TECHNICAL FIELD OF THE INVENTION

The present invention relates to the general art of land vehicles, and to the particular field of brake systems for trucks, more specifically, the invention relates to air brake systems for trucks.

BACKGROUND OF THE INVENTION

Modern tractor-trailer combination vehicles require a properly functioning braking system in order to stop safely. If any portion of the braking system malfunctions, an unbalanced braking situation may result. For example, if a malfunction occurs in the trailer braking system while the tractor braking system functions normally, jack-knifing may occur. The problem is particularly acute if two or more trailers are involved in so-called "turnpike trains" in which a single tractor pulls two or three trailers.

Brake-related problems account for over half of all violations that can bring a highway transport vehicle into an out-of-service state during roadside inspections. Brake problems are also a common cause of transport vehicle accidents, and have been cited as a factor in nearly 30% of all truck related accidents by the Commercial Vehicle Safety Association. For vehicle owners or operators of these vehicles, brake problems can therefore lead to costly downtime and, in the event of an accident, possible liability and insurance expenses. In many cases, status of brake systems is assessed during roadside service inspections. These brake system inspections involve the measurement of the travel distance of the brake push rod to an accuracy level on the order of a fraction of an inch. However, it is estimated that 9% of vehicles that pass this test still have other brake issues that are difficult or impossible to detect without otherwise removing the wheel and/or dismantling the brake system and that warrant an out-of-service violation.

In the prior art, heavy duty trucks and other large vehicles are typically equipped with an air brake actuating system. The air brake actuating system applies air to a service chamber to move a diaphragm in a first direction. A push rod typically moves with the diaphragm, and the push rod is connected to a linkage that actuates the vehicle brakes. An emergency chamber is generally also attached adjacent to the service chamber, and is operable to move the push rod in the event that the air system fails. To this end, a high strength power spring is typically incorporated into the emergency chamber to actuate the push rod when there is a failure in the system air line. This spring also typically actuates the push rod when the vehicle is parked.

A brake actuator has a predetermined amount of available movement, or stroke, for the push rod. The amount of movement of the push rod required to fully actuate the brakes must be carefully monitored such that it is within the stroke of the brake actuator. The prior art has experienced situations wherein there has been an excessive amount of push rod movement for actuation of the brake system. This excessive required push rod movement can be created by any one of several factors. Typically, excessive movement is due to brake lining wear. As the brakes wear, more movement of the push rod is required to actuate the brakes. Further, as the linkages, connections, etc. between the members connecting the push rod to the brakes bend or become loose or excessively worn, additional push rod movement may be required to adequately stroke the brake. A combination of these several features may sometimes cause the amount of push rod movement required to actuate the brakes to approach the available push rod movement, or stroke, from the brake actuator. This is, of course, an undesirable situation.

The prior art has attempted to monitor the amount of push rod movement during actuation of the brake, and provide some indication to an operator of when there is excessive push rod movement. The determination of when there is excessive push rod movement is dependent upon the designed stroke, or rated stroke, of the brake actuator. In addition, an apparatus known as a slack adjuster is typically placed between the push rod and the foundation brake. The slack adjuster is incrementally adjusted to compensate for slack in the braking system and to decrease the required push rod movement. Automatic slack adjusters are now available which automatically adjust the foundation brake system.

Therefore, there is a need for a system which constantly monitors each of the brakes of a truck braking system and warns the operator when any brake is operating out of spec.

There is a further need for a system which constantly monitors each of the brakes of a truck braking system and warns the operator when any brake is operating out of spec and which identifies the brake in need of attention.

It is often uneconomical to change brakes as soon as they begin to operate out of spec. However, there must be a balance between economy and safety. Therefore, there is a need for a brake monitoring system that can be adjusted to account for the need to balance economy with safety. Such a system should warn the vehicle operator that the brakes are entering a range where they should be closely watched and change will be needed soon. Such a system should also be adjustable to be able to accommodate the capabilities and desires of the individual operator.

SUMMARY OF THE INVENTION

These and other objects are achieved by an air brake monitoring system which provides a warning signal, either visual or audible, to truckers informing them when their brake system needs corrective attention. More particularly, the system of the present invention permits the brake monitoring system to be easily adjusted to account for the needs and desires of the individual vehicle operator.

Specifically, the system of the present invention monitors each brake and each monitor includes an electronic microswitch that is activated via the slack adjustor to alert a driver that the truck/trailer brakes need adjustment. One monitor is installed to be associated with each wheel and is connected to a signal light located in the truck cabin. Each monitor is also connected to a signal light located on the outside of the truck. With this arrangement, truckers can automatically receive a warning signal informing them that the brake system needs attention.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 shows an alternative form of the invention which includes two microswitch activating elements to generate a first alert when the brake unit is nearing an out-of-spec condition and a second alert when the brake unit is actually operating out of spec.

DETAILED DESCRIPTION OF THE INVENTION

Figure 1:
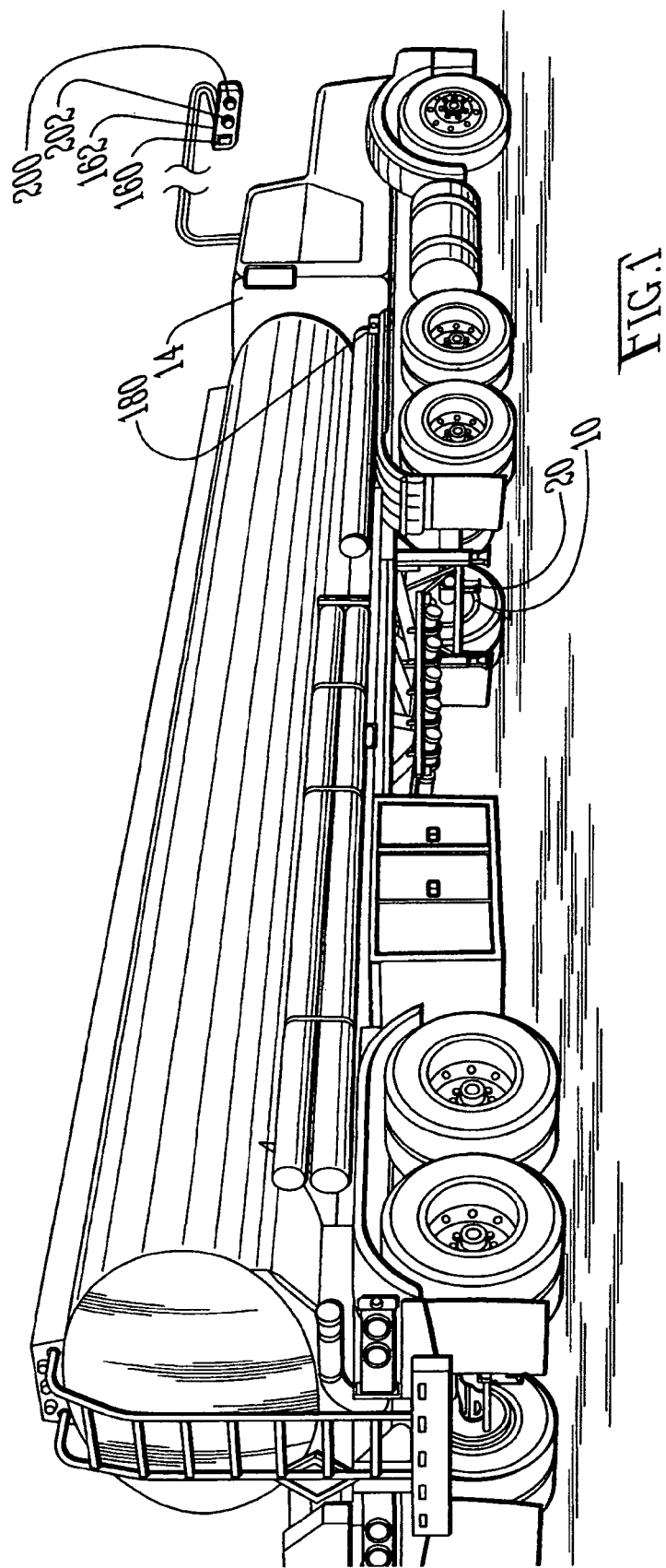
FIG. 1 shows a truck having the brake monitoring system embodying the present invention.

Referring to the figures, it can be understood that the present invention is embodied in a system which permits a vehicle operator to monitor the state of the brakes of a land vehicle, such as a truck in a manner which permits the monitoring system to be easily and efficiently customized to meet the particular needs and desires of the vehicle operator.

Specifically, the present invention is embodied in system 10 for monitoring the brakes of a truck 14 and generating a signal when a brake unit is in need of attention. System 10 includes a brake system which has a plurality of brake units, such as indicated by reference numeral 20 associated with the wheels of the truck, with each brake unit being associated with a brake of a wheel.

The brake units are identical and each brake unit includes a brake chamber assembly 30 which has a diaphragm unit 40 which is operably connected to an air supply via a brake pedal in the truck to be receive air when the brake pedal is actuated as will be known by those skilled in the art. Each brake unit further includes a push rod 50 connected to the diaphragm unit to be moved by the diaphragm unit in direction 52 when the diaphragm unit receives air. A slack adjuster 60 is connected to the push rod to move therewith in direction 62. Connecting elements 70 connecti the slack adjuster to brake shoes (not shown) of the truck to move those brake shoes a distance which corresponds to the movement of the slack adjuster to slow and/or stop the truck in a manner known to those skilled in the art.

Figure 2:
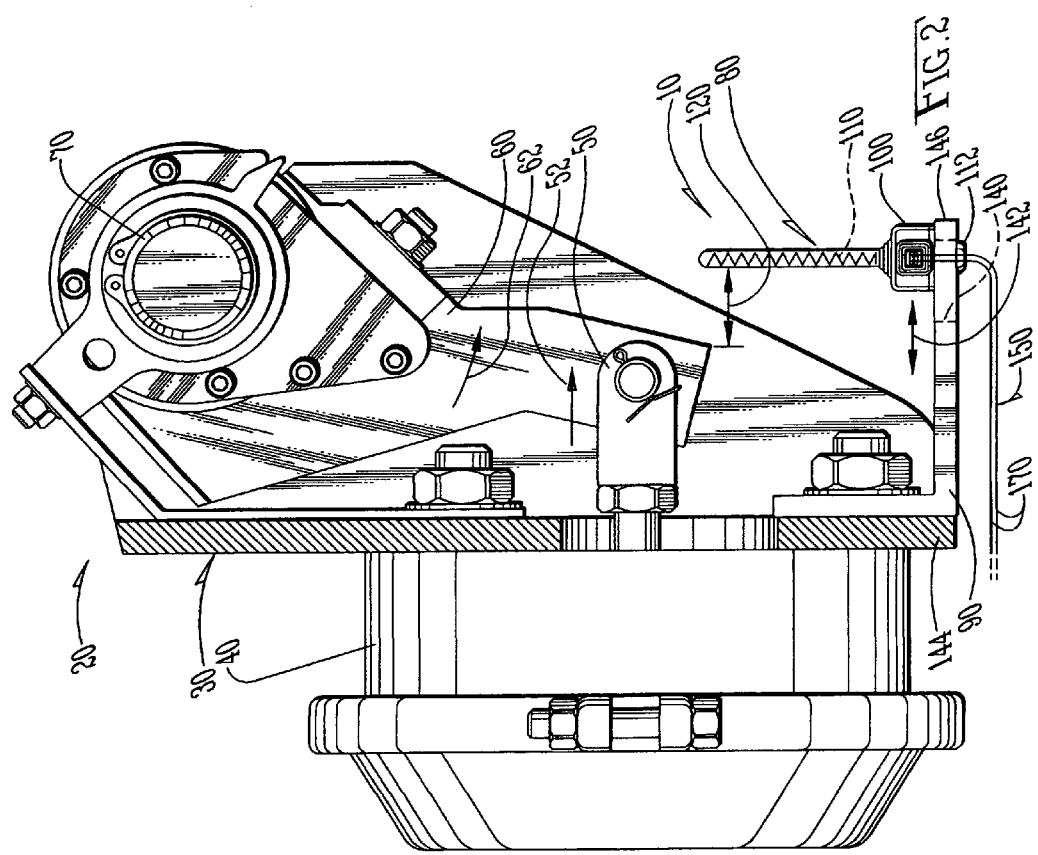
FIG. 2 shows a brake chamber assembly which includes a brake monitor embodying the teaching of the present invention.

A brake unit monitor 80, such as shown in FIG. 2, is associated with each brake unit. Each brake unit monitor includes a base plate 90 mounted on the brake chamber, a first microswitch 100 mounted on the base plate adjacent to the slack adjuster, and a first microswitch activating element, such as spring 110, mounted on the base plate and connected to the first microswitch to operate the first microswitch when the first microswitch activating element is operated.

Figure 3:
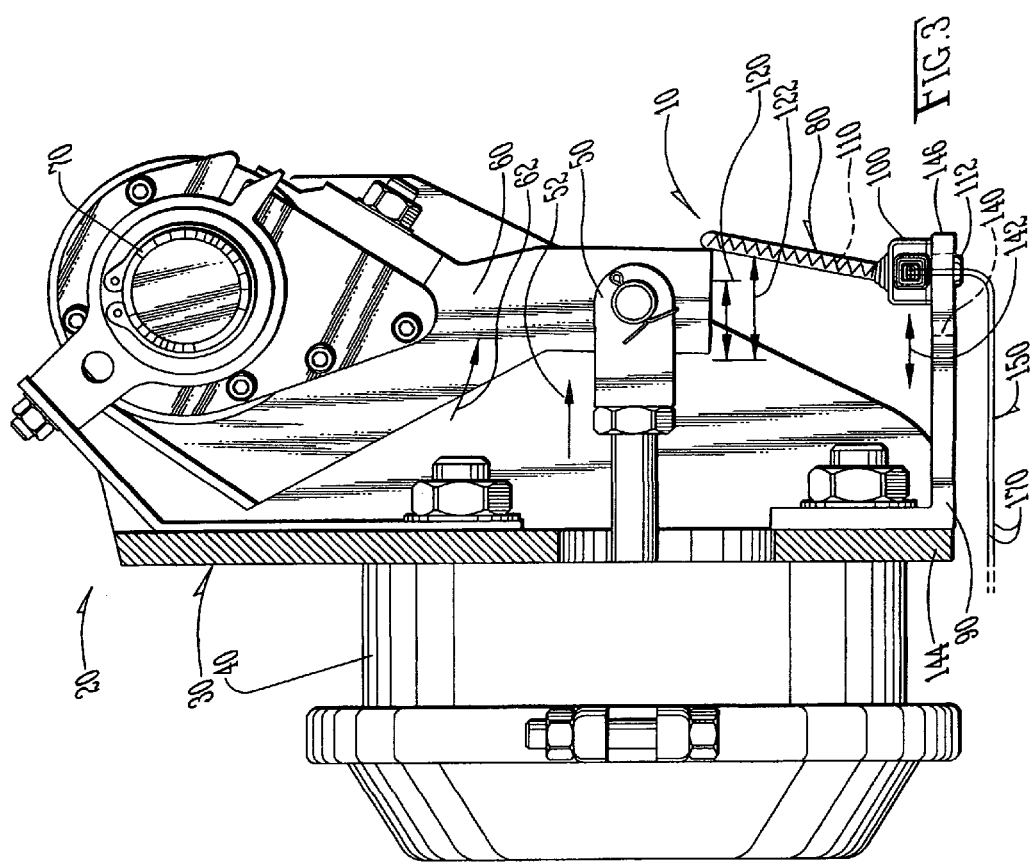
FIG. 3 shows contact between the slack adjuster and the microswitch activating element to activate the system and generate an alert signal when the brake unit associated with the microswitch is not operating in a desired manner.

As indicated in FIGS. 2 and 3, the first microswitch activating element is located on the base plate spaced apart from the slack adjuster and in position to be contacted by the slack adjuster when it is operating to apply the brake associated therewith. The first microswitch activating element is located a distance 120 from the slack adjuster so normal operation of the slack adjuster will not have the slack adjuster contact the first microswitch operating element. As is understood by those skilled in the art, as brake elements become worn, the brake elements must be moved farther to engage sufficiently to slow or stop the vehicle. As the brake elements are required to move farther, the push rod, and hence the brake adjuster, must move correspondingly farther. This adjustment is indicated in FIG. 2 by arrow 122 as being closer to the first microswitch activating element. Therefore, the distance 120 is selected so that when the slack adjuster moves during normal brake operation, there is no interference between the slack adjuster and the first microswitch activating element. However, as the brake elements become worn, the slack adjuster has to move in direction 122 farther to apply the brakes in the desired manner. This condition is indicated in FIG. 3 by distance 124 which is greater than pre-set distance 120. As will be understood from FIG. 3, the pre-set distance 120 is selected so that the slack adjuster will contact the first microswitch activating element to activate the first microswitch as soon as the brake units are no longer operating in the desired manner. Thus, normal operation of the brakes will not cause interference between the slack adjuster and the first microswitch activating element, but when the brake associated with the monitor is in need of attention, such as when the brake elements are worn, the push rod and hence slack adjuster will have to move farther than normal which allows the first microswitch activating element to be contacted by the slack adjuster when the slack adjuster has moved a pre-set distance to contact the first microswitch operating element and operate the first microswitch. In this manner, each brake unit is constantly monitored and as soon as the brake unit associated with a brake unit monitor begins to operate out of specification, the first microswitch will be activated.

A slot 140 is defined in base plate 90 adjacent to first microswitch activating element 110 and first microswitch 100 so the first microswitch activating element can be moved in directions 142 to adjust the pre-set distance. The slot extends from adjacent to plate 144 on which base plate 90 is mounted to adjacent to distal end 146 of base plate 90 so there is a great deal of flexibility in positioning the microswitch and the microswitch activating element with respect to the slack adjuster whereby the vehicle operator or other person in charge of the brakes of the vehicle will have great flexibility in customizing the brake monitoring system to his or her particular needs and desires, The preferred pre-set distance 120 is two inches. The slot is wide enough so the mounting element can be securely fastened to the base plate adjacent to the slot yet can be easily moved along the base plate in the slot. Mounting element 112 on the base plate using slot 140 permits the switch to be moved and customized to accommodate the particular needs and desires of the vehicle operator. That is, one operator may wish to replace the brakes later than another. The first operator may then position element 110 at a location spaced apart from the slack adjuster that differs from the spacing set by the second operator. In fact, an operator can easily change the spacing as his or her needs change.

System 10 further comprises a signal system 150 which alerts an operator or other person as soon as one of the brake units is not operating in the desired manner. System 150 includes a first signal element 160 located on a panel 162 located in the truck. First signal element 160 is electrically connected, as by conductors 170, to the first microswitch of each of the brake unit monitors on the truck to be activated when the slack adjuster of any one of the brake unit monitors moves a distance at least equal to the pre-set distance and contacts the first microswitch activating element to operate the first microswitch.

System 150 further includes second signal, such as signal 180 located on the outside of the truck. Second signal 180 is associated with all of the brake units on the truck and is electrically connected to the first microswitch of each brake unit to be activated when the slack adjuster of one brake unit monitor moves a distance at least equal to the pre-set distance and contacts the first microswitch activating element to operate the first microswitch of the one brake unit associated therewith. Thus, when any of the brake unit monitors detects a brake unit operating out of spec, signal 180 will be activated. Signals 160 and 180 can be lights to generate a visible signal, or elements which generate an audible signal, or both as desired.

System 150 further includes a plurality of third signals, such as signals 200 and 202, located on panel 162 inside the truck and which are similar to signals 160 and 180. Each third signal has one brake unit monitor associated therewith. Each third signal is electrically connected to the brake unit monitor associated therewith to be activated when the slack adjuster of the associated brake unit monitor moves a distance at least equal to the pre-set distance and contacts the first microswitch activating element to operate the first microswitch of the associated brake unit. In this manner, a vehicle operator will be alerted when any of the brakes units is operating out of spec and will be alerted as to which brake unit is the unit in need of attention.

When all three signals are in use, an operator will be alerted from either inside or outside the vehicle when there is at least one brake unit in need of attention. When all three signals are in use, the operator can identify which unit is in need of attention.

An alternative form of the system is shown in FIG. 4. The alternative form of the system includes a warning microswitch activating element 220 near the first microswitch activating element but within the pre-set distance between the slack adjuster and the first microswitch activating element to generate a warning alert when the brake unit is nearing an out-of-spec condition and a second alert when the brake unit is actually operating out of spec. For example, if the pre-set distance 120 is two inches, warning microswitch activating element 220 could be set at one inch so it is activated prior to the activation of switch 100 and alert a vehicle operator that the brake system is close to operating out of spec, but is not yet out of spec. As with the embodiment discussed above, the switches 100 and 220, and their associated switch activation elements, are mounted on the base plate using slot 140 so they can be moved and adjusted to customize the monitoring and alarms to the individual needs and desires of the vehicle operator. Thus, for example, one operator might be comfortable with the brakes of the vehicle actually out of spec whereas another operator may not be comfortable with the brakes of the vehicle operation within, but close to, spec.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for monitoring the brakes of a truck and generating a signal when a brake unit is in need of attention comprising:
   A) brake system of a truck which includes
   (1) a plurality of brake units, and
   (2) each brake unit being associated with a brake of a wheel;
   B) each brake unit including
   (1) a brake chamber assembly,
   (2) a diaphragm unit which is operably connected to an air supply via a brake pedal in the truck to be receive air when the brake pedal is actuated,
   (3) a push rod connected to the diaphragm unit to be moved by the diaphragm unit when the diaphragm unit receives air,
   (4) a slack adjuster connected to the push rod to move therewith, and
   (5) connecting elements connecting the slack adjuster to brake shoes of the truck to move those brake shoes a distance which corresponds to the movement of the slack adjuster;
   C) a brake unit monitor associated with each brake unit, each brake unit monitor including
   (1) a base plate mounted on the brake chamber,
   (2) a first microswitch mounted on the base plate adjacent to the slack adjuster,
   (3) a first microswitch activating element mounted on the base plate and connected to the first microswitch to operate the first microswitch when the first microswitch activating element is operated, and
   (4) the first microswitch activating element being located on the base plate spaced apart from the slack adjuster a distance which allows the first microswitch activating element to be contacted by the slack adjuster when the slack adjuster has moved a pre-set distance and to be untouched by the slack adjuster when the slack adjuster has moved a distance less than the pre\-set distance; and
   D) a signal system which includes
   (1) a first signal element located in the truck,
   (2) the first signal element being electrically connected to the first microswitch of each of the brake unit monitors on the truck to be activated when the slack adjuster of any one of the brake unit monitors moves a distance at least equal to the pre-set distance and contacts the first microswitch activating element to operate the first microswitch, and
   (3) a second signal located on the truck, said second signal being associated with all of the brake units on the truck, said second signal being electrically connected to the fast microswitch of each brake unit to be activated when the slack adjuster of one brake unit monitor moves a distance at least equal to the pre-set distance and contacts the first microswitch activating element to operate the first microswitch of the one brake unit associated therewith.

2. The system defined in claim 1 wherein the first microswitch activating element includes a spring.

3. The system defined in claim 2 wherein the pre-set distance is two inches.

4. The system defined in claim 3 wherein the second signal includes a light mounted on the outside of the truck.

5. The system defined in claim 4 wherein the first signal is located inside the truck.

6. The system defined in claim 4 further including a plurality of third signals, with each third signal having one brake unit monitor associated therewith, each third signal being electrically connected to the brake unit monitor associated therewith to be activated when the slack adjuster of the associated brake unit monitor moves a distance at least equal to the pre-set distance and contacts the first microswitch activating element to operate the first microswitch of the associated brake unit.

7. The system defined in claim 6 wherein the third signals are located inside the truck.

8. The system defined in claim 1 further including a slot defined in the base plate adjacent to the first microswitch activating element so the first microswitch activating element can be moved to adjust the pre-set distance.

9. The system defined in claim 8 wherein each brake unit monitor further includes a warning microswitch activating element near the first microswitch activating element but within the pre-set distance between the slack adjuster and the first microswitch activating element to generate a warning alert when the brake unit is nearing an out-of-spec condition and a second alert when the brake unit is actually operating out of spec.

10. The system defined in claim 9 wherein the warning microswitch is mounted on the base plate adjacent to the slot so the warning microswitch activating element can be moved to adjust the distance between the warning microswitch activating element and the slack adjuster.

\* \* \* \* \*